Nov. 4, 1969 F. SPIROCH ET AL 3,476,299

ARRANGEMENT FOR MONITORING MOVEMENTS OF TAPE

Filed Oct. 19, 1966

INVENTORS
Franz Spiroch
Werner Beckert

BY

Michael J. Striker
ATTORNEY

United States Patent Office 3,476,299

Patented Nov. 4, 1969

3,476,299

ARRANGEMENT FOR MONITORING MOVEMENTS OF TAPE

Franz Spiroch, Eschborn, and Werner Beckert, Frankfurt am Main, Germany, assignors to Eichner Organisation G.m.b.H., Frankfurt am Main, Germany Filed Oct. 19, 1966, Ser. No. 587,825
Claims priority, application Germany, Oct. 23, 1965, E 30,354
Int. Cl. B65h 25/14
U.S. Cl. 226—32 7 Claims

ABSTRACT OF THE DISCLOSURE

In a tape recording or reproducing apparatus in which the tape is lengthwise advanced by a rotary transporting member which engages the tape and in which the apparatus includes a monitoring arrangement provided with signal generating means directly connected to and rotatable with the rotary transporting member and signal transmitting means operated by the signal generating means.

Figure 1:
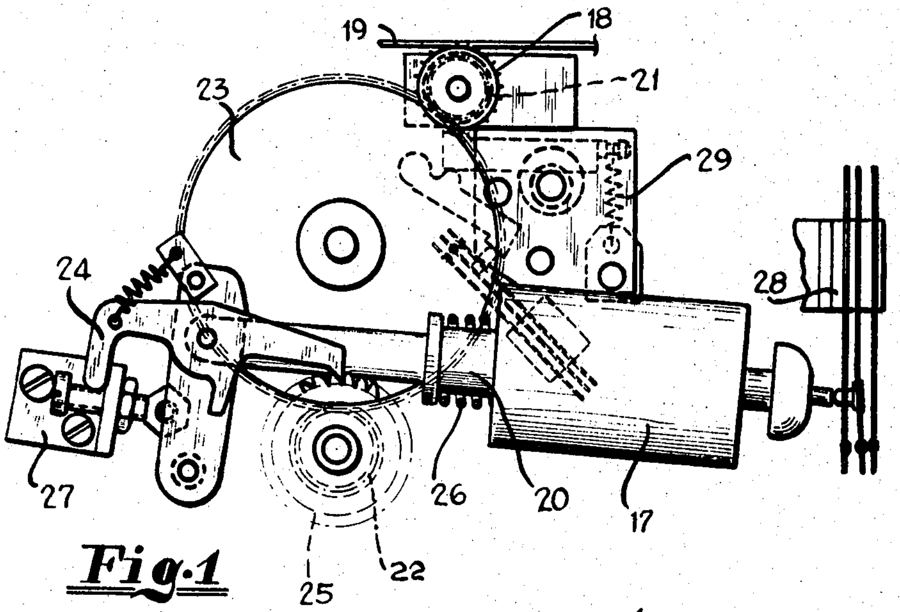

The present invention relates to an arrangement for monitoring or supervising movements of elongated carriers of information in punching, decoding and like apparatus which are utilized to record information on or to reproduce information from tape-like carriers. More particularly, the invention relates to a monitoring arrangement which can be utilized in apparatus wherein perforated tape is fed lengthwise by a wheel- or drum-shaped transporting member having pins, needles, teeth or analogous projections arranged to enter the perforations of a tape-like carrier of information to advance the carrier through increments of desired length.

In presently known information recording or reproducing apparatus of the type to which the present invention pertains, movements of the tape are monitored indirectly, i.e., the signals indicating movements of tape are derived from a motor, electromagnet or another drive which constitutes a prime mover for the tape-engaging drum or wheel. For example, it is known to provide the monitoring arrangement with a switch which opens or closes in direct response to changes in condition of an electromagnet serving as a prime mover for the tape-engaging rotary member. The switch transmits signals which are indicative of intermittent movements of the tape. It was found that such conventional monitoring arrangements operate satisfactorily only if the motion transmitting connection between the prime mover and the tape-engaging rotary member is intact. However, an undetected break in or an undetected faulty operation of such motion transmitting connection will not affect the operation of the monitoring arrangement so that the latter will continue to transmit signals even though the tape will not move at all.

Accordingly, it is an important object of the present invention to provide a monitoring arrangement which will invariably operate in synchronism with movements of the record carrier and which will reliably indicate when the system is out of commission.

Another object of the invention is to provide a monitoring arrangement which can be readily built into presently known punching, decoding and analogous recording or reproducing apparatus.

A further object of the invention is to provide a monitoring arrangement which occupies little room, which can be installed in tape recording or reproducing apparatus wherein the tape is advanced by means of a motor or electromagnet, and which can detect defects in operation of the motion transmitting connection between the prime mover and the tape.

Briefly stated, one feature of the present invention resides in the provision of a tape recording or reproducing apparatus which comprises transporting or motion transmitting means including a sprocket, a wheel, a drum or an analogous rotary transporting member having spikes, teeth or equivalent means for directly engaging the tape, drive means for the transporting means including a motor, an electromagnet or an analogous prime mover, and monitoring means including signal generating means operatively connected with and movable by the transporting means, and signal transmitting means responsive to movements of the signal generating means. For example, the signal generating means may comprise a cam which is directly connected to and receives motion from or transmits motion to the rotary transporting member. The signal transmitting means then comprises a follower which tracks the cam and can actuate one or more switches, either directly or through a suitable transmission.

Due to placing of the signal generating means into the power train between the prime mover and the rotary tape transporting member, the operation of the improved monitoring arrangement is very reliable because the arrangement is much less likely to produce false signals.

Figure 2:
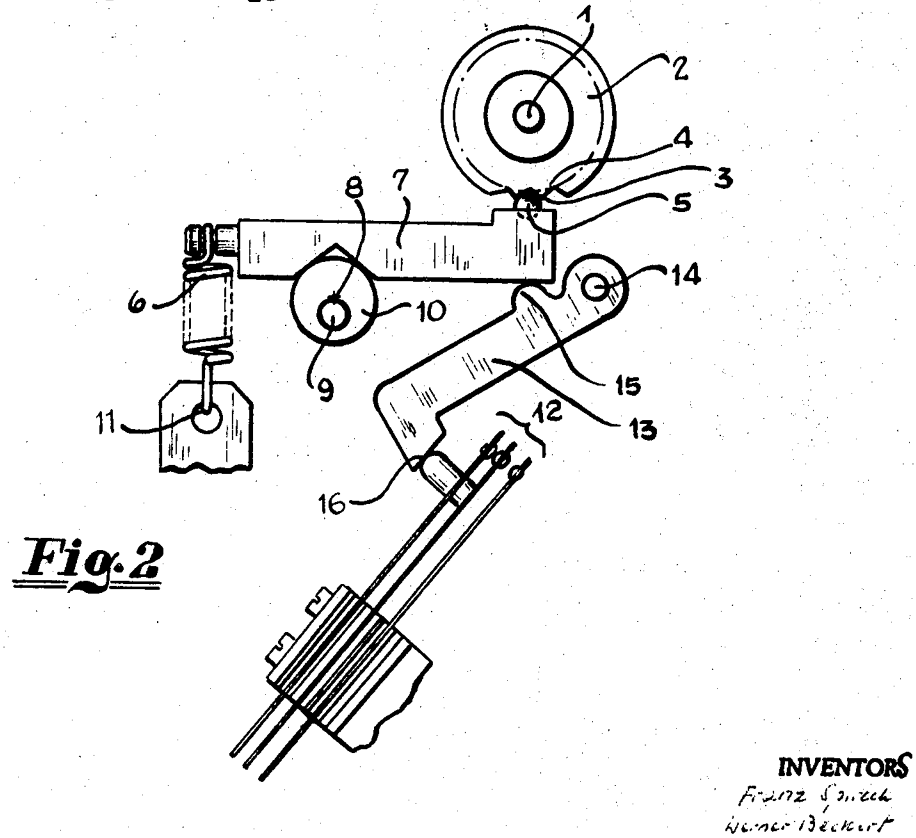

The novel features which are considered as characteristic of the invention are set forth in particular in the appended claims. The improved monitoring arrangement itself, however, both as to its construction and its mode of operation, together with additional features and advantages thereof, will be best understood upon perusal of the following detailed description of certain specific embodiments with reference to the accompanying drawings, in which:

FIG. 1 is a diagrammatic front elevational view of a punching apparatus including a monitoring arrangement which embodies one form of the present invention; and FIG. 2 is an enlarged rear elevational view of a portion of the structure shown in FIG. 1.

FIG. 1 shows a prime mover in the form of an electromagnet 17 which constitutes a drive means for a rotary transporting member 18 having teeth, pins, needles or analogous projections entering the perforations of a tape 19 which is advanced lengthwise when the member 18 (hereinafter called sprocket) rotates. The sprocket 18 forms part of a transporting or motion transmitting unit which is operated by the armature 20 of the electromagnet 17 and includes a driver gear 22 meshing with an intermediate gear 23 which meshes with a gear 21 of the sprocket 18. The armature 20 can rock a pawl 24 which turns the driver gear 22 through a ratchet wheel 25. A spring 26 biases the armature 20 to idle position. A mechanism 27 serves to adjust the strokes of the pawl 24. The numeral 28 denotes a switch which is actuated by the armature 20.

The improved monitoring arrangement is mounted at that side of a panel 29 which faces away from the observer of FIG. 1 and is shown on a larger scale in FIG. 2. The sprocket 18 is rotatable about the axis of a shaft 1 and is rigidly connected with a signal generating element here shown as a cam 2 having a peripheral cam face provided with alternating lobes 3 and valleys or notches 4. If desired, the cam 2 may form an integral part of the sprocket 18. The angle between two successive notches 4 corresponds to an increment of intermittent lengthwise movement of the tape 19. In the illustrated embodiment, the cam 2 is a so-called disk cam; however, it is equally within the purview of the invention to utilize a signal generating element in the form of a face cam or any other part which shares, responds to or transmits movements to the sprocket 18 and is located past the electromagnet 17, as viewed in the direction in which the electromagnet transmits motion to the sprocket 18. If the sprocket performs the function of a signal generator for the improved monitoring arrangement, the lobes 3 and notches 4 can be provided directly in the peripheral surface of the sprocket.

The signal transmitting means of the monitoring arrangement comprises a spherical follower 5 which tracks the face of the cam 2 and travels radially of the shaft 1 in response to angular displacement of the sprocket 18. The function of the follower 5 is to actuate a switch 12 through the intermediary of a transmission including a two-armed lever 7 and a one-armed lever 13, the latter having a trip 16 which can displace the central contact of the switch 12. The lever 13 is pivoted at 14 and carries a rounded projection 15 which engages one arm of the lever 7 along a line located in the common plane of the axes of shaft 1 and follower 5. The elasticity of the median contact of the switch 12 is just sufficient to maintain the projection 15 in abutment with the lever 7. The latter is fulcrumed on on eccentric 10 which is adjustable about an axis 9. The left-hand arm of the lever 7 is biased by a helical spring 6 which is anchored at 11. The numeral 8 denotes the axis of the eccentric 10. The function of the spring 6 is to bias the follower 5 against the face of the cam 2. When the sprocket 18 turns about the axis of the shaft 1, the lever 7 is rocked about the axis 8. It will be seen that the axis 8 and the anchor 11 constitute two fixed reference points for the movable parts 5, 6 and 7. The lever 13 is mounted in such a way that the displacement of trip 16 exceeds several times the displacement of projection 15 when the follower 5 moves from a lobe 3 into a notch 4 or vice versa. The switch 12 then transmits electric signals which are indicative of lengthwise movement of the tape 19.

It is clear that the follower 5 of FIG. 2 can be replaced by other signal generating means without departing from the spirit of the present invention. For example, the monitoring arrangement could utilize a photoelectric cell or an electromagnet which would generate a signal in direct response to angular displacements of the sprocket 18. Furthermore, the electromagnet 17 could be replaced by a motor which would impart movements directly to the driver gear 22 or to the pawl 24. A motor-driven decoding apparatus which may embody the improved monitoring arrangement is described and shown on page 294 of the fourth edition of a German-language book by Dr.-Ing. Fritz Schiweck, entitled "Fernschreibetechnik." The cam 2 could be installed behind the coupling element 9 shown in FIG. 217 on page 294 of this book.

The switch 28 controls the electromagnet 17. For example, the circuit of the electromagnet 17 may include a relay whose holding circuit is opened by the switch 28.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. In a tape recording or reproducing apparatus, an assembly comprising drive means; motion transmitting means operated by said drive means and including a rotary transporting member having means for directly engaging and advancing the tape lengthwise; and a monitoring arrangement including signal generating means and signal transmitting means responsive to movement of said signal generating means, said signal generating means comprising cam means driven by said motion transmitting means and said signal transmitting means comprising follower means in form of a ball tracking said cam means, and electric switch means movable between a plurality of positions in response to movement of said ball radially of said transporting member.

2. An assembly as defined in claim 1, wherein said transporting member comprises projections adapted to enter perforations provided in the tape and wherein said drive means is arranged to effect intermittent angular movements of said transporting member.

3. An assembly as defined in claim 1, wherein said signal generating means is integral with said transporting member.

4. An assembly as defined in claim 1, wherein said drive means comprises motor means operative to effect intermittent rotary movements of said transporting member.

5. An assembly as defined in claim 1, wherein said drive means comprises electromagnet means arranged to effect intermittent rotary movements of said transporting member.

6. In a tape recording or reproducing apparatus, an assembly comprising drive means; motion transmitting means operated by said drive means and including a rotary transporting member having means for directly engaging and advancing the tape lengthwise; and a monitoring arrangement including signal generating means movable by said motion transmitting means and signal transmitting means responsive to movement of said signal generating means, said signal generating means comprising a cam driven by said motion transmitting means and having a cam face provided with alternating lobes and notches, said signal transmitting means comprising follower means tracking said cam face, electric switch means, and transmission means connecting said follower means with said switch means to change the position of the latter in response to movement of said cam, said transmission means comprising a two-armed lever having a first arm connected with said follower means and a second arm, resilient means connected to said second arm for biasing said follower means against said cam face, and a second lever rockable by said two-armed lever and having trip means for actuating said switch means.

7. An assembly as defined in claim 6, further comprising fulcrum means for said two-armed lever, said fulcrum means being adjustable between a plurality of positions to change the location of the pivot axis of said two-armed lever.

References Cited

UNITED STATES PATENTS

| | | | |
|---|---|---|---|
| 2,142,880 | 1/1939 | Anderson et al. | 226—100 |
| 2,933,931 | 4/1960 | Lisinski | 226—76 |
| 2,934,753 | 4/1960 | Laman | 226—100 |
| 2,994,074 | 7/1961 | Durand et al. | 226—100 |
| 3,044,675 | 7/1962 | Turner et al. | 340—259 |
| 3,275,208 | 9/1966 | Poumakis | 226—9 |

M. HENSON WOOD, Jr., Primary Examiner

R. A. SCHACHER, Assistant Examiner

U.S. Cl. X.R.

226—157; 340—259